(12) United States Patent
Niembro et al.

(10) Patent No.: US 10,741,928 B2
(45) Date of Patent: Aug. 11, 2020

(54) METHOD FOR INCREASING THE TRANSMISSION OF RADIOFREQUENCY ELECTROMAGNETIC WAVES THROUGH THERMALLY INSULATING GLASS SHEETS

(71) Applicants: CENTRE TECHNIQUE DE L'INDUSTRIE DES PAPIERS, CARTONS ET CELLULOSES, Grenoble (FR); UNIVERSITE GRENOBLE ALPES, Saint Martin d'Heres (FR); INSTITUT POLYTECHNIQUE DE GRENOBLE, Grenoble (FR)

(72) Inventors: Alejandro Niembro, Grenoble (FR); Guy Eymin-Petot-Tourtollet, Tencin (FR); Emmanuel Pistono, Domene (FR); Pierre Lemaitre-Auger, Malissard (FR); Tan-Phu Vuong, Saint Martin d'Heres (FR)

(73) Assignees: CENTRE TECHNIQUE DE L'INDUSTRIE DES PAPIERS, CARTONS ET CELLULOSES, Grenoble (FR); UNIVERSITE GRENOBLE ALPES, Saint Martin d'Heres (FR); INSTITUT POLYTECHNIQUE DE GRENOBLE, Grenoble (FR)

( * ) Notice: Subject to any disclaimer, the term of this patent is extended or adjusted under 35 U.S.C. 154(b) by 197 days.

(21) Appl. No.: 15/737,198

(22) PCT Filed: Jun. 17, 2016

(86) PCT No.: PCT/FR2016/051489
§ 371 (c)(1),
(2) Date: Dec. 15, 2017

(87) PCT Pub. No.: WO2016/203180
PCT Pub. Date: Dec. 22, 2016

(65) Prior Publication Data
US 2018/0159241 A1    Jun. 7, 2018

(30) Foreign Application Priority Data
Jun. 19, 2015   (FR) ..................... 15 55638

(51) Int. Cl.
*B32B 3/02*       (2006.01)
*H01Q 15/00*      (2006.01)
(Continued)

(52) U.S. Cl.
CPC ........ *H01Q 15/0013* (2013.01); *C03C 17/23* (2013.01); *C03C 17/34* (2013.01); *C03C 2218/365* (2013.01); *H01Q 1/1271* (2013.01)

(58) Field of Classification Search
CPC .. H01Q 15/0013; H01Q 1/1271; C03C 17/23; C03C 17/28; C03C 17/34
See application file for complete search history.

(56) References Cited

U.S. PATENT DOCUMENTS

| 9,878,597 B2 * | 1/2018 | Rousselet | ......... B32B 17/10192 |
| 2003/0080909 A1 * | 5/2003 | Voeltzel | ............ B32B 17/10174 343/713 |

(Continued)

FOREIGN PATENT DOCUMENTS

WO    2014060203 A1    4/2014

OTHER PUBLICATIONS

Officer Jurgen Wrba, "International Search Report and the Written Opinion", counterpart International PCT Patent Application PCT/FR2016/051489, dated Sep. 9, 2016, 10 pp.

(Continued)

*Primary Examiner* — Elizabeth E Mulvaney
(74) *Attorney, Agent, or Firm* — Kaplan Breyer Schwarz, LLP

(57) ABSTRACT

The invention relates to a glazing including a glass sheet, one surface of which is covered with a conductive layer. Said glass sheet comprises, at a nonzero distance from the conductive layer, a periodic pattern of conductive elements that is suitable for increasing, for a predetermined frequency, the transmission of radiofrequency electromagnetic waves. Said periodic pattern is selected so as to have a transmission zero at a frequency of between substantially half and substantially double the frequency to be amplified.

10 Claims, 2 Drawing Sheets

(51) Int. Cl.
  *C03C 17/23* (2006.01)
  *C03C 17/34* (2006.01)
  *H01Q 1/12* (2006.01)

(56) References Cited

U.S. PATENT DOCUMENTS

| | | | |
|---|---|---|---|
| 2011/0210903 A1* | 9/2011 | Sarabandi | H01Q 15/0086 343/904 |
| 2014/0060203 A1* | 3/2014 | Diatzikis | G01P 5/02 73/861 |
| 2014/0370210 A1* | 12/2014 | Schreiber | H01Q 17/00 428/34 |
| 2016/0286609 A1* | 9/2016 | Paulus | B32B 17/10192 |

OTHER PUBLICATIONS

Langley et al., "Equivalent Circuit Model for Arrays of Swuare Loops", Electronics Letters, Apr. 1, 1982, pp. 294-296, vol. 18 No. 7.

Kiani et al., "Cross-Dipole Bandpass Frequency Selective Surface for Energy-Saving Glass Used in Buildings", IEEE Transactions on Antennas and Propagation, Feb. 2011, pp. 520-525, vol. 59 No. 2.

* cited by examiner

METHOD FOR INCREASING THE TRANSMISSION OF RADIOFREQUENCY ELECTROMAGNETIC WAVES THROUGH THERMALLY INSULATING GLASS SHEETS

The present patent application claims the priority benefit of French patent application FR15/55638 which is herein incorporated by reference.

BACKGROUND

The present application relates to the transmission of radiofrequency electromagnetic waves through glazing having a surface coated with a conductive layer, and more particularly thermally-insulating glazing having a surface coated with a metal oxide.

DISCUSSION OF THE RELATED ART

Filters intended for the shielding of a room or of a building against certain electromagnetic waves have been developed. Such filters may be formed of films shielding the carrier frequencies of wireless telecommunication systems.

This type of film with a periodic pattern of conductive elements is called frequency selective surface and is generally called FSS in the art.

FIG. 1A discloses an embodiment of a FSS film 10 comprising a pattern of conductive elements 11 periodically repeated in the vertical and horizontal directions, and arranged on a dielectric support 12. Each element 11 of the pattern has the shape of a square with an empty center. Each side of the square has a length d and a width s. The squares are repeated with a pitch p.

The pattern of FIG. 1A is for example described in R. J. Langley, E. A. Parker's article, "Equivalent circuit model for arrays of square loops"—ELECTRONIC LETTERS Jan. 4, 1982, Vol. 18, No7.

FIG. 1B is a curve illustrating transmission T (in decibels) according to frequency f (in GHz) of a FSS film of the type in FIG. 1A when the film is placed on a partition or a glass sheet. The transmission curve has a maximum attenuation peak at the frequency of the transmission zero, the gain in decibels being substantially zero elsewhere. The above-mentioned article indicates that the wavelength corresponding to the frequency of the transmission zero is substantially equal to the perimeter of a square 11.

Conversely, filters intended to compensate for the unintentional shielding of a room or of a building against certain electromagnetic waves have been developed. Indeed, glazings coated with a metal oxide layer prove to be particularly efficient for thermal insulation but strongly attenuate radiofrequency electromagnetic waves.

G. I. Kiani, L. G. Olsson, A. Karlsson, K. P Esselle, M Nilsson's article, "Cross-Dipole Bandpass Frequency Selective Surface for Energy Saving Glass Used in Buildings"— IEEE TRANSACTION ON ANTENNAS AND PROPAGATION, February 2011, Vol. 59, No2, describes a periodic pattern of openings etched in the metal oxide layer of such glazing which enables to limit the attenuation for certain RF frequencies. The article however mentions that such an etching results in a significant degradation of the thermal insulation of the glazing.

SUMMARY

There thus is a need to compensate, for certain RF frequencies, for the attenuation of electromagnetic waves due to glazings coated with a metal oxide layer without modifying the thermal insulation performance of the glazings.

An embodiment provides glazing comprising a glass sheet having a surface coated with a conductive layer, comprising at a non-zero distance from the conductive layer a periodic pattern of conductive elements intended to increase, for a determined frequency, the transmission of radiofrequency electromagnetic waves, said periodic pattern being selected to have a transmission zero at a frequency in the range from substantially half to substantially twice the frequency to be amplified.

According to an embodiment, the periodic pattern of conductive elements is formed on a flexible and transparent dielectric support.

According to an embodiment, the dielectric support is adhesive to the glass.

According to an embodiment, each conductive element has the shape of a square with an empty center.

According to an embodiment, each conductive element has a circular shape.

According to an embodiment, the glazing comprises two or three glass sheets, and the conductive layer is formed on an inner surface of a glass sheet.

According to an embodiment, the conductive layer has a resistance in the range from 1 to 1,000 •/•.

According to an embodiment, the conductive layer is a layer of a metal oxide or of a polymer.

An embodiment provides a method of amplifying the transmission at a determined frequency of glazing comprising a glass sheet having a surface coated with a conductive layer, comprising coating a face of the glazing with a periodic pattern of conductive elements, capable of increasing, for a determined frequency, the radiofrequency electromagnetic wave transmission, said periodic pattern being selected to have a transmission zero at a frequency in the range from substantially half to substantially twice the frequency to be amplified.

According to an embodiment, said determined frequency is a frequency used by telecommunication systems.

BRIEF DESCRIPTION OF THE DRAWINGS

The foregoing and other features and advantages will be discussed in detail in the following non-limiting description of specific embodiments in connection with the accompanying drawings, among which.

The same elements have been designated with the same reference numerals in the different drawings and, further, the various drawings are not to scale.

DETAILED DESCRIPTION

In the following description, unless otherwise specified, expressions "substantially" and "approximately" mean to within 10%, preferably to within 5%.

Figure 2:
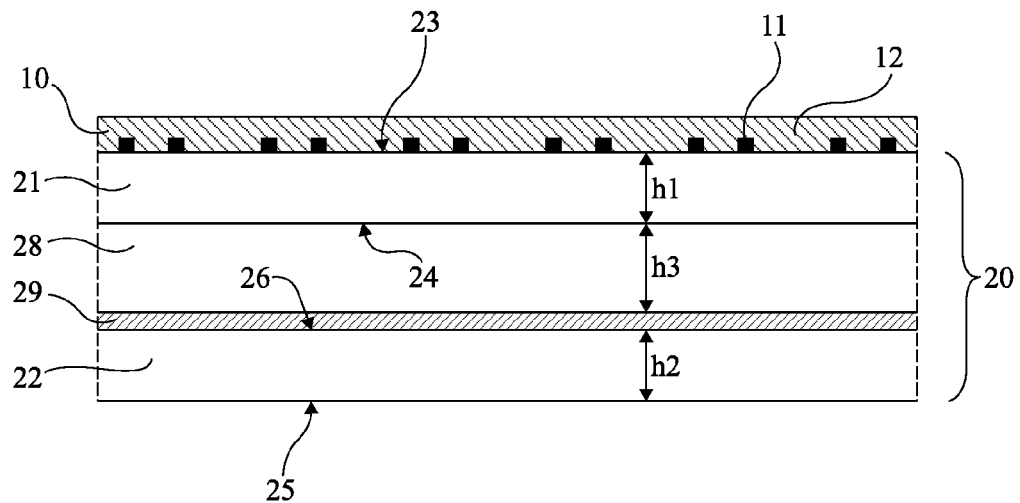
FIG. 2 is a cross-section view of an embodiment of a thermally-insulating double glazing equipped with a FSS filter.

FIG. 2 is a cross-section view of a thermally insulating double glazing 20. Double glazing 20 comprises a first glass sheet 21 and a second glass sheet 22, parallel to each other. Glass sheet 21 has a thickness $h_1$, an outer surface 23 and an inner surface 24. Glass sheet 22 has a thickness $h_2$, an outer surface 25, and an inner surface 26. Inner surfaces 24 and 26 facing each other are separated by a thickness $h_3$ of gas 28 which may be depressurized. Inner surface 26 of glass sheet 22 is coated with a metal oxide layer 29.

In practice, the above-mentioned elements of a double glazing are connected by a frame, the assembly forming a window, a door, or another partition. It is not possible to modify the assembly without destroying the product. The values of parameters $h_1$, $h_2$, and $h_3$ are thus imposed by the manufacturer.

In FIG. 2, a FSS film 10 comprising a pattern of conductive elements 11 and a dielectric support 12 is placed again outer surface 23 of glass sheet 21. Pattern 11 for example corresponds to that of FIG. 1A.

Figure 3:
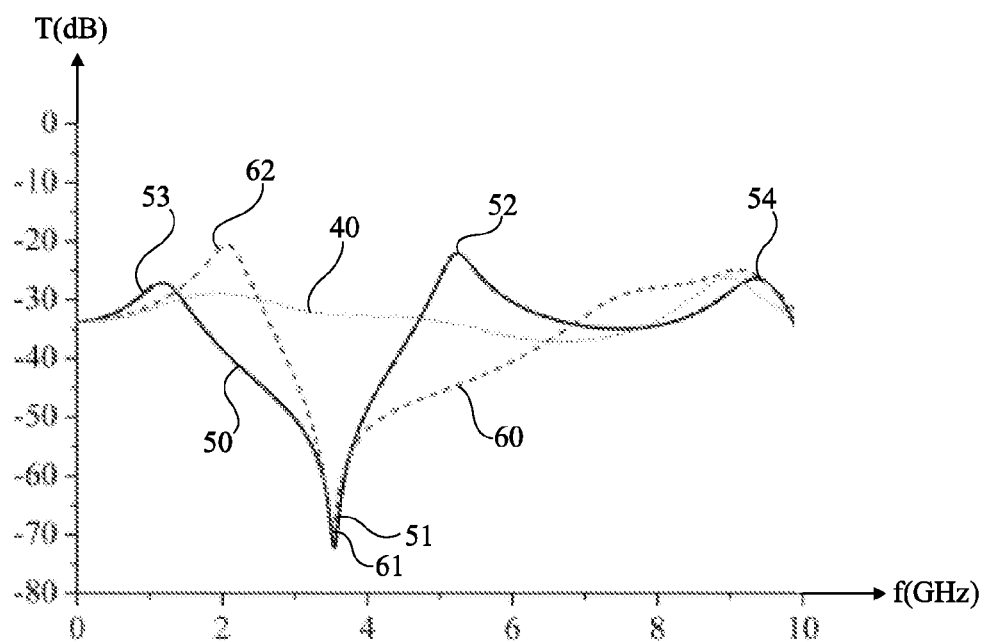
FIG. 3 illustrates the variation of transmission T according to frequency, in various conditions, of glazing having a surface coated with a metal oxide layer.

FIG. 3 illustrates the variation, according to frequency f (in GHz), of transmission T (in decibels) of a double glazing 20 having a surface coated with a metal oxide layer 29, in various conditions. The values of the transmission correspond to a double glazing 20 such as shown in FIG. 2, with the following parameter values: $h_1$=4 mm, $h_2$=6 mm, and $h_3$=16 mm.

Curve 40 corresponds to a double glazing 20 having a surface coated with a metal oxide layer 29, in the absence of a FSS film. Curve 40 shows that there then is a substantially constant attenuation of the transmission, by approximately 35 dB.

Curve 50 illustrates the transmission of a double glazing 20 having a surface coated with a metal oxide layer 29, equipped with a FSS film 10 on outer surface 23 of glass sheet 21, as shown in FIG. 2. The transmission attenuated by double glass 20 then exhibits an attenuation peak 51 similar to that of FIG. 1B. An amplification peak 52 as well as two low-amplification lobes 53 and 54 can further be observed. Attenuation peak 51 is located at the attenuation frequency of FSS film 10. Amplification peak 52 is located at a frequency greater than but close to the attenuation frequency and has an amplitude greater by approximately 10 dB than the average attenuation corresponding to curve 40. Amplification lobes 53 and 54 are located on either side of and at frequencies distant from the attenuation frequency, their amplitudes are approximately 3 dB below the average attenuation corresponding to curve 40.

Curve 60 illustrates the transmission of a double glazing 20 having a surface coated with a metal oxide layer, equipped with a FSS film 10 on outer surface 25 of glass sheet 22. The transmission attenuated by double glazing 20 then exhibits an attenuation peak 61 similar to that of FIG. 1B as well as an amplification peak 62. Attenuation peak 61 is located at the attenuation frequency of FSS film 10. Amplification peak 62 is located at a frequency smaller than but close to the attenuation frequency and has an amplitude greater by approximately 10 dB than the average attenuation corresponding to curve 40.

There thus appears that a FSS film placed against a double glazing having a surface distant from this film coated with a conductive metal oxide layer introduces not only a transmission zero, but also an amplification peak close to the transmission zero.

Tests and simulations carried out by the inventors show that, for a given double glazing (having fixed parameters $h_1$, $h_2$ and $h_3$), there always exists an amplification peak close to the transmission zero. The frequency distance between the transmission zero and the amplification peak depends on the parameters of the glazing and can be determined by calculations implying simulation steps. In the case of loop FSS patterns of the type shown in FIG. 1A, calling $f_0$ the frequency of the amplification peak, the frequency of the transmission zero is in the range from substantially $f_0/2$ to $2f_0$.

More particularly, the calculation of the position of the amplification peak (resonance) is performed by means of electromagnetic simulation calculation software available for sale (of HFSS or CST type). The first step of the method comprises achieving a 3-dimensional physical modeling of the FSS structure (for example, by means of the principle of Floquet's theorem) superimposed to the glass sheet and located at a non-zero distance from the lightly-conductive metal oxide layer. To position the amplification peak, the second step comprises iteratively optimizing the dimensions of the FSS structure by varying the dimensions of the FSS structure.

It should be reminded that a number of studies indicate how to determine the elements of a FSS pattern to obtain an attenuation peak at a desired frequency. As previously indicated, in the case of a pattern corresponding to that of FIG. 1A, the wavelength corresponding to the attenuation frequency is substantially equal to the perimeter of a conductive element of this pattern.

The presence of such amplification peaks is imputed to the matching of the impedance of the window having a reinforced insulation with that of air (377 ohm) due to the FSS structures deposited at a non-zero distance from the conductive layer.

Specific embodiments have been described. Various alterations, modifications, and improvements will readily occur to those skilled in the art.

The previously-described FSS patterns are formed on a flexible and transparent support or dielectric film which may be adhesive to the glass to be applied to definitively assembled glazings, possible already mounted. The FSS patterns may also be directly formed on a glass sheet.

The frequency of the amplification peak will for example correspond to a frequency used by telecommunication systems.

Figure 1A:
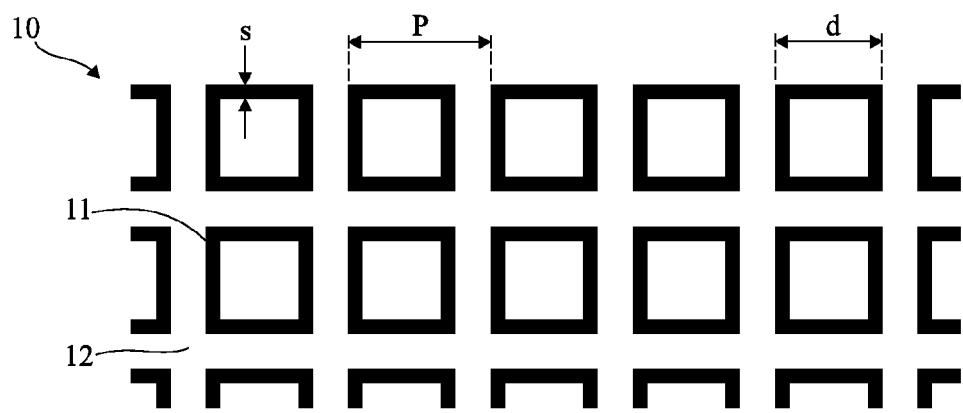
FIG. 1A shows a FSS film comprising a periodic pattern of conductive elements on a dielectric support.
Figure 1B:
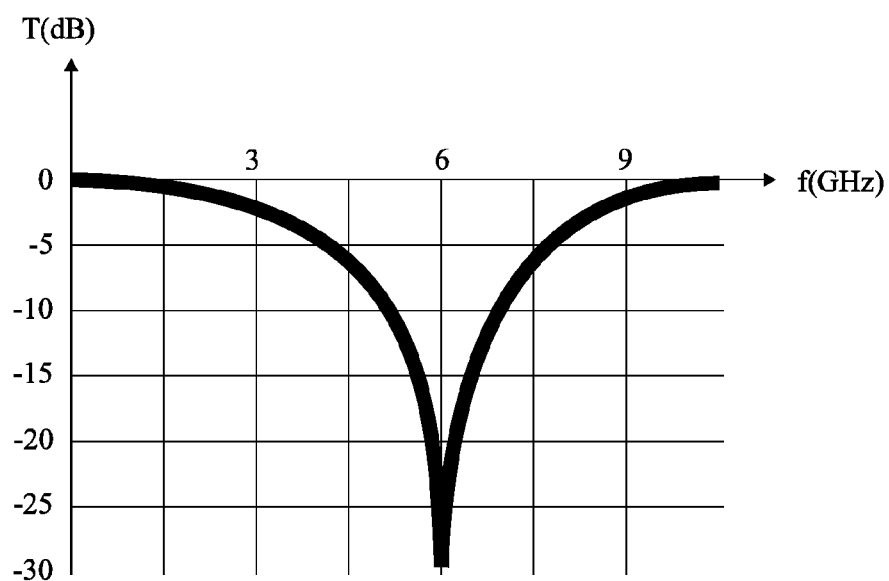
FIG. 1B is a curve illustrating the transmission according to frequency of a FSS film of the type in FIG. 1A.

The conductive elements distributed according to the pattern shown in FIG. 1A may have a shape other than square, for example, a circular, or even rectilinear shape.

Further, an embodiment where the invention is applied to a double glazing has been described. The invention also applies to the case of a thermally-insulating triple glazing or even of a simple glass sheet having a surface coated with a conductive layer, for example having an antireflection function. The conductive layer will for example have a resistance in the range from 1 to 1,000 •/•. This layer will not necessarily be a metal oxide. It will for example be a polymer or a multilayer in the case of an antireflection layer.

The invention claimed is:

1. Glazing comprising a glass sheet having a surface coated with a conductive layer, comprising at a non-zero distance from the conductive layer a periodic pattern of conductive elements capable of increasing, for a determined frequency, the transmission of radiofrequency electromagnetic waves, said periodic pattern being selected to have a transmission zero at a frequency in the range from substantially half to substantially twice the frequency to be amplified.

2. The glazing of claim 1, wherein the periodic pattern of conductive elements is formed on a flexible and transparent dielectric support.

3. The glazing of claim 2, wherein the dielectric support is adhesive to the glass.

4. The glazing of claim 1, wherein each conductive element has the shape of a square with an empty center.

5. The glazing of claim 1, wherein each conductive element has a circular shape.

6. The glazing of claim 1, comprising two or three glass sheets, wherein the conductive layer is formed on an inner surface of a glass sheet.

7. The glazing of claim 1, wherein the conductive layer has a resistance in the range from 1 to 1,000 Ω/□.

8. The glazing of claim 7, wherein the conductive layer is a layer of a metal oxide or of a polymer.

9. A method of amplifying the transmission at a determined frequency of glazing comprising a glass sheet having a surface coated with a conductive layer, comprising coating a wall of the glazing with a periodic pattern of conductive elements, capable of increasing, for a determined frequency, the radiofrequency electromagnetic wave transmission, said periodic pattern being selected to have a transmission zero at a frequency in the range from substantially half to substantially twice the frequency to be amplified.

10. The method of claim 9, wherein said determined frequency is a frequency used by telecommunication systems.

* * * * *